United States Patent
Hagino et al.

[15] 3,655,486
[45] Apr. 11, 1972

[54] APPARATUS FOR PRODUCING THERMOPLASTIC SYNTHETIC RESIN LAMINATED MATERIAL HAVING A LARGE NUMBER OF INDEPENDENT AIR CELLS

[72] Inventors: Seiji Hagino, Nagoya-shi; Kohei Masuda, Yokkaichi-shi; Kazumasa Hasegawa, Yokkaichi-shi; Yasuzi Hosono, Yokkaichi-shi, all of Japan

[73] Assignees: Hagino Kiko Company Limited, Nagoya-shi; Mitsubishi Petrochemical Company Limited, Tokyo-to, Japan

[22] Filed: May 26, 1969

[21] Appl. No.: 827,657

[52] U.S. Cl. ............................ 156/360, 156/244, 156/285, 156/498, 156/500, 156/377
[51] Int. Cl. ........................................ B29j 1/00, B32b 3/30
[58] Field of Search ............... 156/377, 498, 500, 501, 285, 156/244, 360; 18/DIG. 60

[56] References Cited

UNITED STATES PATENTS

| | | | |
|---|---|---|---|
| 2,830,648 | 4/1958 | Haddox | 156/377 X |
| 3,043,738 | 7/1962 | Demeter et al. | 156/501 X |
| 3,421,964 | 1/1969 | Arbit | 156/500 X |
| 3,449,187 | 6/1969 | Bobkowicz | 156/500 X |
| 3,142,599 | 7/1964 | Chavannes | 156/285 X |
| 3,165,432 | 1/1965 | Plaskett | 156/285 X |

FOREIGN PATENTS OR APPLICATIONS

22,317   6/1930   Netherlands...........................156/377

*Primary Examiner*—Carl D. Quarforth
*Assistant Examiner*—E. E. Lehmann
*Attorney*—McGlew and Toren

[57] ABSTRACT

Production of thermoplastic synthetic resin laminated material having a large number of independent air cells, the method comprising steps of extruding two sheets of filmy molten resin, engaging one of the sheets of filmy molten resin onto an endless molding belt, which has a large number of independent holes, and before the filmy molten resin sheets harden, applying a suction to the one filmy molten resin sheet corresponding to the holes of the endless molding belt, and bonding the other sheet of filmy molten resin on the flat side of the one of the filmy molten resin sheets, the product may be used for packing or buffering of articles.

6 Claims, 13 Drawing Figures

INVENTORS
SEIJI HAGINO
KOHEI MASUDA
KAZUMASA HASEGAWA
YASUZI HOSONO

BY McGrew and Toren
ATTORNEYS

APPARATUS FOR PRODUCING THERMOPLASTIC SYNTHETIC RESIN LAMINATED MATERIAL HAVING A LARGE NUMBER OF INDEPENDENT AIR CELLS

BACKGROUND OF THE INVENTION

A method has been known for producing thermoplastic, synthetic resin laminate, comprising steps of heating one of a thermoplastic synthetic resin film near to the melting point, after which engaging said heated film onto a molding metal roll peripherally provided with a large number of recesses and extremely small holes therein so as to form a large number of bulged portions on the surface of said film, and bonding at least one surface of another thermoplastic synthetic film on the flat surface of said one film after having heated it near to the melting point. This method comprises steps of molding of film, preheating of the film, and embossing one of the preheated film, bonding of another preheated film on the flat surface of said embossed film. Among these steps, particularly one which bonds one of the films on the flat surface of another film was effected after each of the films have been preheated. This must be done because these films could not be bonded unless they had been preheated near to their melting points. Such a method is not economical in the point that it requires a large quantity of heat for production. It also requires a high degree of technique in forming a large number of sucking holes (recesses) to be provided in the molding metal roll, and also in forming a large number of extremely small holes, in general, less than 0.5 mm in diameter in each of said numerous sucking holes. It requires also a number of complicated mechanisms such as exhausting device, cooling device, rotating mechanism, etc.

Therefore it costs much when the metal roll is to be replaced for modifying the pattern of emboss molding; moreover, various traces are left resulting from pressing on the metal surfaces, and since the sucking holes are extremely small the holes are easily blocked by resin or other foreign matters, and the percent of defects in the manufactured product is increased and the yield becomes poor.

As a further prior art, it is known to emboss on one of the film, applying a bonding agent on the flat side of the film, and superposing and bonding the other film on the pasted surface. Such a method is uneconomical as a means for continuous and mass-productive process, because it requires such steps as molding of film, preheating of film, application of bonding agent, and drying process.

The object of the present invention is to provide a method and apparatus for producing thermo-plastic synthetic resin laminates having a large number of independent air cells, which is obtained by mounting a die, having at least two parallel slits, on an extruder, engaging a filmy molten resin extruded obliquely and downwardly from one of said parallel slits onto a curved surface of a rotating endless molding belt from a direction substantially tangent to said path so as to emboss the film, causing to contact the other filmy molten resin extruded downwardly from the other of said parallel slits on the flat surface of said first one of the film engaged on the curved surface of said endless molding belt at a predetermined angle, whereby said one of the film and the other film are pressed and bonded while said films are still in molten state extruded from a die mounted on the extruder.

BRIEF SAMMARY OF THE INVENTION

An object of the present invention is to provide a method and apparatus for producing thermoplastic synthetic resin laminates having a large number of independent air cells by continuously laminating a plurality of filmy molten resin extruded from an extruder while the films are still in a molten state, at a high speed and a low cost with a heat consumption as small as possible.

Another object of the present invention is to provide a method and apparatus for producing thermoplastic laminates having a large number of air cells which do not require any bonding agent and which require no pre-heating before laminating process.

Further object of the present invention is to provide a method and apparatus in which one of a plurality of filmy molten resin which have been extruded from a plurality of parallel slits of a die mounted on an extruder is subjected to an embossing process while the filmy molten resin have a uniform heat distribution, and almost at the same time bonding the other filmy molten resin into a unitary laminate.

Another object of the present invention is to provide a method and apparatus, in which one of two filmy molten resin sheets which have been extruded obliquely and downwardly from a plurality of parallel slits of a die mounted on an extruder engaged in a substantially tangential direction on curved surface of a moving, endless molding belt, and subjecting the film to an embossing process, and bonding the flat surface of the embossed film with the other filmy molten resin extruded downwardly from the other slit which is parallel to the former at an optimum state.

Further object of the present invention is to provide a method and apparatus which improves a stability, transparency, and bonding strength of molding of thermoplastic synthetic resin laminates, formed with a large number of independent and projecting air cells filled with air and distributed horizontally, by means of supplying liquid, such as cooling water, between the upper surface of curved path of said endless molding belt and the filmy molten resin made to engage on said curved path, and which improves the strength of the air cells projectingly formed on the surface of a thermoplastic synthetic resin laminate as well as the filling rate of air.

Another object of the present invention is to provide a method and apparatus wherein on the flat surface of one of the filmy molten resin, which has been made to engage on the curved path of an endless molding belt in a direction substantially of tangent, is bonded another filmy molten resin, and after which applying on this bonded material with compressing medium such as compressed air, then cooling it quickly, whereby to improve the molding stability, transparency, bonding strength of the thermoplastic synthetic resin laminates as well as the strength and stability, quantity of air filling the air cells formed projectedly on the laminate. In this invention, in order to emboss the filmy molten resin, a heat-resisting, flexible, endless molding belt is used, on which has been formed and arranged a desired number and shape of holes, so that it is easy to form on said endless belt a large number of holes in an appropriate arrangement. Moreover the height of the air cells formed by embossing can be selected freely by selecting the thickness of the endless belt; the formation of the design pattern is also easy, and particularly the putting and removing of the belt is so easy when the belt is to be replaced. This molding belt also plays a role of transmission belt, which cooperates with the series of other rolls in the apparatus so that the entire mechanism is simplified.

DETAILED DESCRIPTION

The thermoplastic resin used in the present invention comprises all the high-molecular organic substance from which the thermoplastic deformation may be obtained, including, for example, polyethylene resin, polypropylene resin, polyethylene terephthalate resin, polyamide resin, polyvinyl chloride resin and the resins of their copolymers, polyvinylidene chloride resin and the resins of their copolymers, etc.

Figure 1:
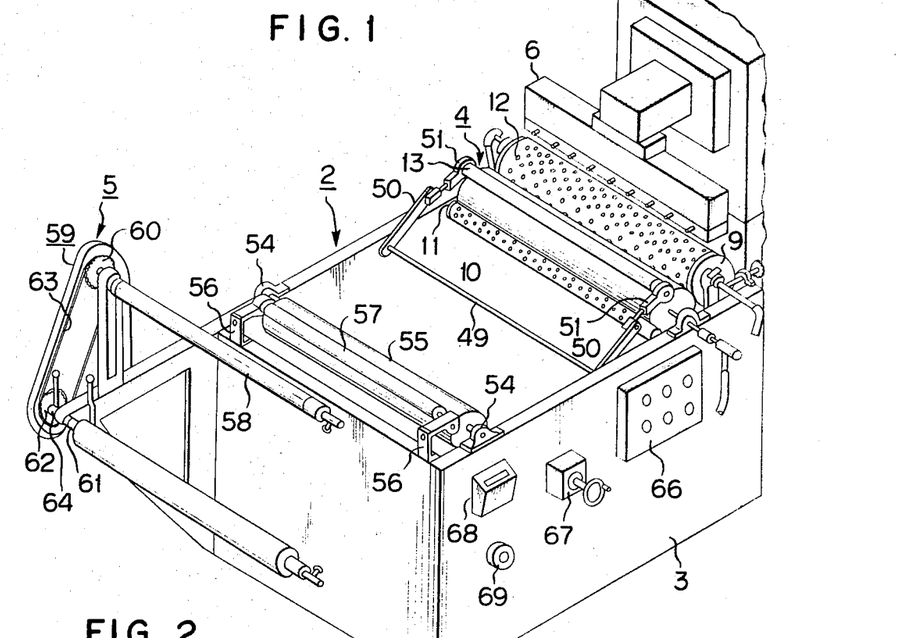
FIG. 1 is a general perspective view of the apparatus according to the present invention.
Figure 2:
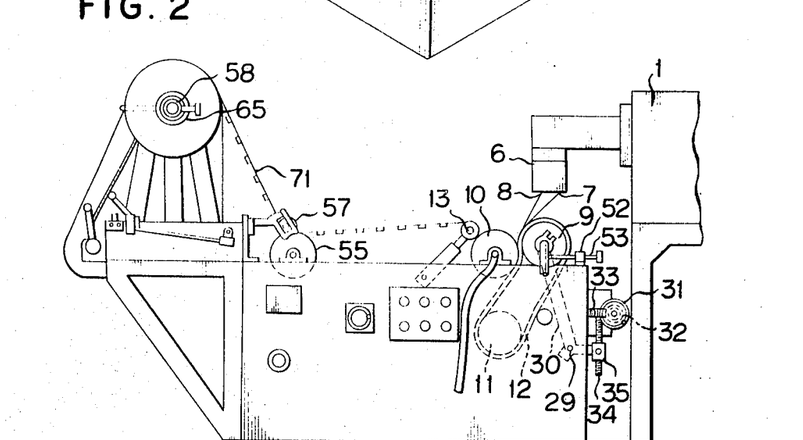
FIG. 2 is a general side elevation of the apparatus according to the present invention.

An example of one embodiment of the present invention will now be explained referring to the drawings. As shown in FIG. 1, a molding device 2 for laminate is provided near an extruder 1. On the machine base 3 of the molding device 2 for laminate are provided a molding mechanism 4 and a taking-up mechanism 5. The molding mechanism 4 is located below a die 6 mounted on said extruder 1. On the lower surface of said die 6 two slits 7, 8 are formed with two slits 7, 8 which are parallel to each other (see FIGS. 2 and 3). Below each of the slits 7, 8 of the molding mechanism 4 are arranged a suction roll 9, a holding and cooling roll 10 opposedly disposed against said suction roll 9, a mounting and cooling roll 11 disposed below said holding and cooling roll 10, an endless molding belt 12 for embossing passed around said suction roll 9 and said mounting and cooling roll 11, a holding roll 13 elastically urged against said holding and cooling roll 10, a guiding and cooling roll 14 for both tightening the endless molding belt 12 for embossing and preventing irregular movement of the belt, and an air-jet cooling tube 15 located inside the endless molding belt 12 for embossing and near the external surface of the suction roll 9. Said endless molding belt 12 is made to run freely between the suction roll 9 and the holding and cooling roll 10 disposed below the slits 7, 8 provided on the lower surface of the die 6. The holding and cooling roll 10 is urged resiliently against the endless belt 12 for embossing 12. The axes of the suction roll 9, the holding and cooling roll 10 and the mounting and cooling roll 11 are all disposed parallel to each other. The mounting and cooling roll 11 is disposed obliquely and downwardly to the suction roll 9 as viewed from the machine side. The endless molding belt 12 passed around the suction roll 9 and the holding and cooling roll 11 is forcibly bent more toward the imaginary plane connecting the centers of the suction roll 9 and the holding and cooling roll 11 than toward the plane connecting the external surfaces of the suction roll 9 and the mounting and cooling roll 11 by means of the holding and cooling roll 10.

Explaining now the die 6 more in detail, it is provided with two slits 7, 8 formed parallel with each other on the lower surface thereof, which serve to extrude two sheets of filmy molten resin 16, 17 simultaneously.

Figures 3, 5:
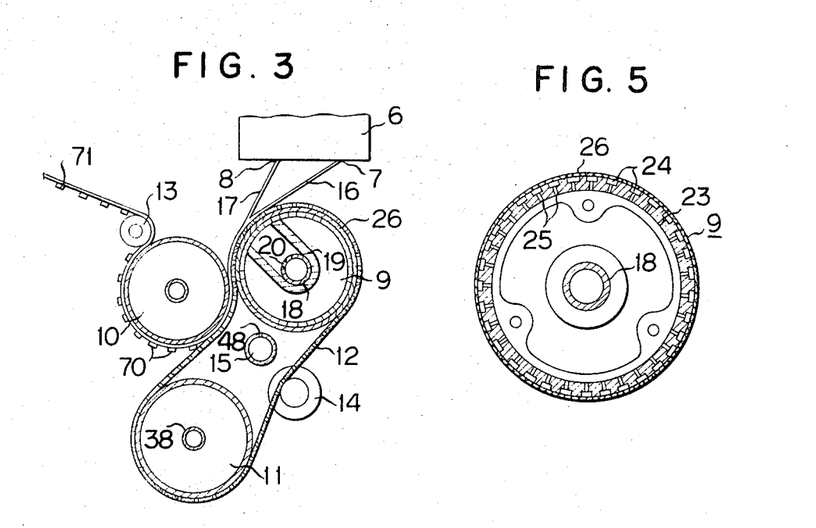
FIG. 3 is a sectional view showing essential parts of the apparatus according to the present invention.
FIG. 5 is a longitudinal sectional view of a sucking roll in the molding mechanism.
Figure 4:
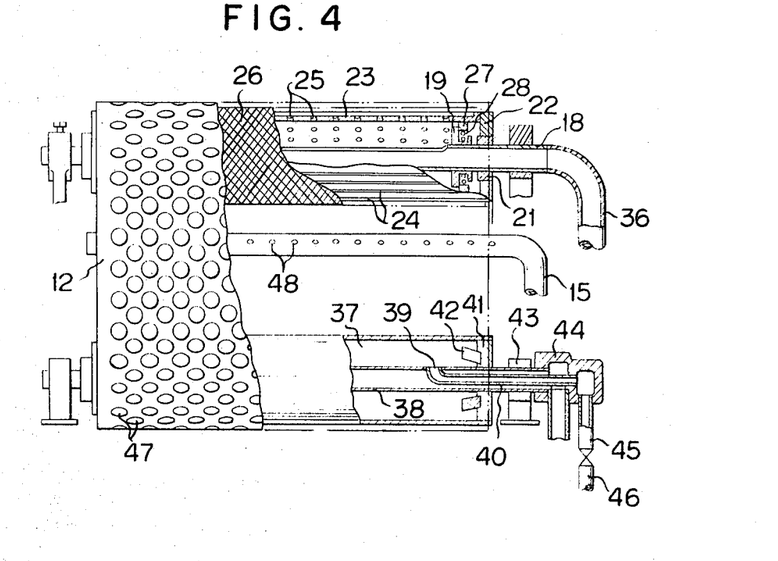
FIG. 4 is an enlarged front elevation of molding mechanism of the apparatus where an endless molding belt is applied, and the essential parts thereof being shown partly broken in longitudinal section.

The base of a vacuum box 19 having a U-section of the suction roll 9 of the molding mechanism 4 is fixed on a hollow shaft 18 as shown in FIGS. 3 to 5. Said hollow shaft 18 is provided with a communicating groove 20 which communicates the interior of the vacuum box 19 with the interior of the hollow shaft 18. On both sides of the hollow shaft 18 are rotatably provided with end covers 22 through bearings 21 so as to form a cylindrical body 23. On the peripheral wall of this cylindrical body 23 are formed a large number of axial ventilating grooves 24 and a large number of small holes 25, 25 . . . . Also a wire gauze 26 covers over the external peripheral surface of the cylindrical body 23, and this metal gauze is made to contact with the inner peripheral surface of the endless molding belt 12 of embossing type 12. In order to maintain the sealing of sliding surface between the inner peripheral surface of the cylindrical body 23 and the vacuum box 19, a packing frame 27 formed by a slidable material such as oil-containing, sintered alloys is fitted resiliently outside the vacuum box 19 by means of a number of springs 28, 28 , . . . so that the edge of the opening of the packing frame 27 is made to contact closely and yet slidable on the inner peripheral surface of the cylindrical body 23. The both ends of the hollow shaft 18 is supported by the upper end of a lever 30, the base portion of the lever 30 being pivoted on a supporting shaft 29 which is horizontally provided on the machine base 3. The position of the suction roll 9 may adjustably be changed by rotating a handle 31 provided on the machine base 3, rotating a screw rod 34 through a worm 32, a worm wheel 33, and by swinging the lever 30 with the supporting shaft 29 as center through a connecting member 35. One end of the hollow shaft 18 is blocked, while the other end of the hollow shaft which is opening is connected to a suction pipe 36 communicating with a vacuum pump (not shown in the drawing) provided outside the machine base 3. Reason why the hollow shaft 18 is arranged at right angle to the lengthwise center line of the machine base 3 is, as shown in FIG. 3, for convenience of adjustment of position of vacuum zone serving for the embossing, sucking action at the inner peripheral surface of the suction roll 9, which rotates the emboss-type, endless molding belt 12 applied thereon, as shown in FIG. 3, the alteration and adjustment of the position of the suction roll 9 with respect to each of the slits 7, 8 of the die 6 may be effected freely by the arrangement of the die 6 and by the relative position where the extruded sheets of filmy molten resins 16, 17 are made to engage with the surface of the embosstype endless molding belt 12. The setting position of the vacuum box 19, that is, the setting position of the vacuum zone is made adjustable by slightly shifting the hollow shaft 18 in a proper direction. As for the holding and cooling roll 10 and the mounting and cooling roll 11, as shown in FIG. 4, a hollow shaft 38 is passed through at the center of the cylinder 37, which is made water-tight, and an opening 39 is formed on the wall of the hollow shaft 38 so as to communicate with the space in the cylinder 37. A feed water pipe 40 inserted into the hollow shaft 38 is connected to the opening 39. A screw vane 42 is secured inside of a flange 41 which causes the hollow shaft 38 to support the cylinder, said screw vane 42 serving to agitate the water introduced in the cylinder 37 and to direct the water to one direction. The hollow cylinder 38 is supported and disposed horizontally at its both ends by bearings 43 fixed on the machine base 3. One end of the hollow shaft 38 is blocked, while the other end is extended to discharge water through a gland 44, and a connecting pipe 46 is connected for feeding cooling water to the feed water pipe 40, which is inserted through the hollow shaft 38, via a valve 45.

Figure 6:
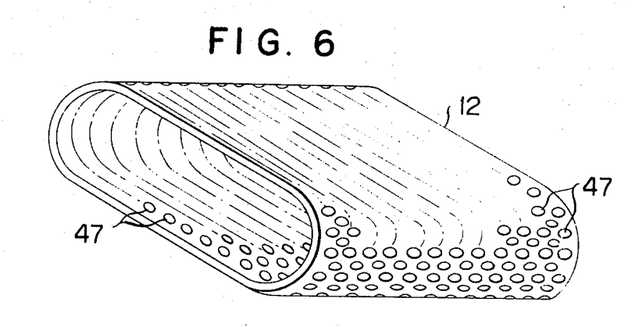
FIG. 6 is a perspective view of the endless molding belt in the molding mechanism.
Figures 7, 8:
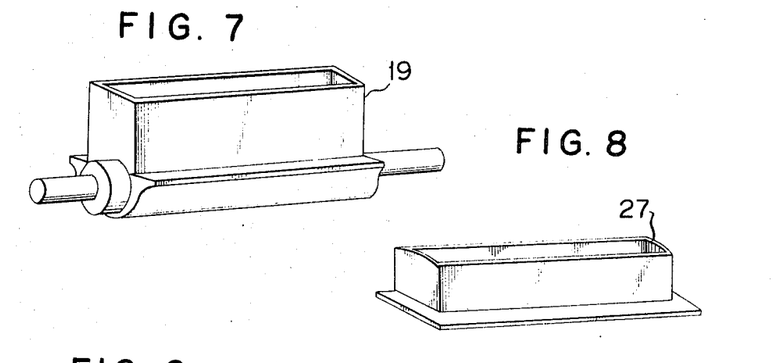
FIG. 7 is a perspective view of a sucking, hermetic box provided inside said sucking roll.
FIG. 8 is a perspective view of a packing frame for maintaining air-tight condition and which is fit with said sucking, hermetic box.

It is preferably that the outer peripheries of the cooling rolls 10, 11 are wound by soft bands such as felt, sponge, or the like material for preventing irregular movement, in widthwise direction, of the emboss-type, endless molding belt 12. The emboss-type, endless molding belt 12 is made of a material having a heat-resisting property and flexibility such as fluorine resin, polyvinylidene chloride resin, silicon resin, heat-resisting, synthetic rubber, etc. As shown in FIG. 6, the endless molding belt 12 is formed with a large number of holes 47, 47 . . . at a predetermined condition according to the size, shape, relative position of arrangement of a large number of air cells to be formed on the laminates being produced.

The air-jet cooling pipe 15 mentioned above is provided with a large number of small holes 48 on the peripheral surface of the metal gauze 26 wrapped around the external periphery of the suction roll and on the inner surface of the emboss-type endless molding belt 12. One end of the cooling pipe 15 is connected to a pressurized air source, such as blower, air compresser, etc., so that both cooling and cleaning actions may be effected at the same time.

The holding roll 13 which is urged resiliently on the holding and cooling roll 10 is supported by cushion members 51, 51 provided at the upper end of arms 50, 50, the base portions of which are fixed on a supporting rod 49, both ends of which are pivoted on the machine base 3.

Also, the end portion of a screw rod 53 engaging with bearings 52 mounted on the machine base 3 is engaged with the upper portion of the lever 30 supporting the hollow shaft 18, the distance between the suction roll 9 and the holding and cooling roll 10 can freely be adjusted by rotating the screw rod 53.

Now, the operation of the take-up mechanism 5 will be explained.

At a predetermined distance from a position where said molding mechanism is mounted on the machine base 3, bearings 54, 54 are mounted on the machine base 3, and a metal roll 55 is mounted horizontally by its end portions on the bearings 54, 54. Then, a rubber roll 57 is mounted by its ends on supporting members 56, 56 mounted on the machine base 3 in such a manner that the rubber roll 57 contacts lightly on the peripheral surface of the metal roll 55.

An automatic taking-up device 59 which can change the rotating speed of a taking-up shaft 58 automatically is provided at a predetermined position opposite to the direction of the position where the extruder 1 is mounted as seen from the position where said metal roll 55 and the rubber roll 57 are arranged. The automatic taking-up device 59 comprises: a taking-up shaft 58, a transmission shaft 61 rotated by power transmitted from an electric motor (not shown), a chain wheel 62 fixed on said transmission shaft 61, a chain 63 passed around said chain wheel 60 and the chain wheel 62, and a clutch 64 for transmission and interruption of rotation provided on the transmission shaft 61. The taking-up shaft 58 is mounted with a take-up reel 65, etc., the rotating speed of the taking-up shaft 58 is so controlled that it becomes slower as the quantity of material to be wound upon the take-up reel 65 is increased, that is, the rotating speed of the taking-up shaft 58 is changed in response to the so-called wound diameter, so that the winding speed is always kept constant, as is well-known in the art.

On the side wall of the machine base 3 are attached such as a switch box 66, switching mechanism 67, a take-up counter 68, emergency buzzer 69, and so on.

The manufacturing apparatus for laminates thus constituted operates as follows:

When the extruder 1 is operated and the filmy molten resin sheets 16, 17 are extruded simultaneously from two slits 7, 8 of the die 6, one sheet 16 of the two filmy molten resin sheets 16, 17 is delivered obliquely and downwardly, and the lower surface of the sheet is engaged on the curved surface of the endless molding belt 12 passed around said suction roll 9 and the mounting and cooling roll 11. The other filmy molten resin sheet 17 is so controlled that it is wrapped on the upper surface of said first filmy molten resin sheet 16 at a point slightly behind from the point where said first filmy molten resin sheet 16 is engaged on the endless molding belt 12 owing to the distance existing between the slits 7, 8 and the angle of engagement of said endless molding belt 12 on the curved path portion. In such a manner, the overlapped body consisting of the first filmy molten resin sheet 16 and the other filmy molten resin sheet 17 is introduced between the holding and cooling roll 10 and the endless molding belt 12. Further, the overlapped and laminated body consisting of the first filmy molten resin sheet 16 and the other filmy molten resin sheet 17 is passed from the lower side of the holding and cooling roll 10, passing through between the holding roll 13 and the holding and cooling roll 10, extending and passing through between the metal roll 55 and the rubber roll 57, and after which the laminated body is wrapped around the take-up reel 65 mounted on the taking-up shaft 58. The mounting and cooling roll 11 is driven positively through a transmission mechanism by a motor (not shown), and accompanied therewith, the endless molding belt 12 is driven, and the suction roll 9 is rotated at the same time. The holding and cooling roll 10 is also driven positively. Therefore, both the filmy molten resin sheet 16 extruded from the slit 7 of said die 6 and the other filmy molten resin sheet 17 extruded from the slit 8 of the die 6 are bonded while they are in a state of being molten, but, before being thus bonded, one of the filmy molten resin 16 is formed with a large number of bulges 70 by being sucked at the corresponding portions of the endless molding belt 12. A moment after said corresponding portions of the filmy molten resin sheet 16 are sucked into a large number of holes 47, 47, . . . in the endless molding belt 12, the other filmy molten resin sheet 17 is overlapped, and both of the filmy molten resin sheets are pressed by means of said endless molding belt 12 and the holding and cooling roll 10, and then cooled. Such a momentary lag is determined as the resultant of such factors as (1) the location slit 7 provided on the lower surface of the die 6 which extrudes the filmy molten resin sheet 16, (2) the location of the slit 8 provided on the lower surface of the die 6 which extrudes the other filmy molten resin sheet 17, (3) the condition in which the filmy molten resin sheet 16 is made to engage on the curved surface of the endless molding belt 12, (4) the condition in which the other filmy molten resin sheet 17 is made to engage with the curved surface of the endless molding belt 12, (5) the angle formed by the filmy molten resin sheet 16, when it is extruded from the slit 7, with the lower surface of the die 6, (6) the angle formed by the other filmy molten resin sheet 17, when it is extruded from the slit 8, with the lower surface of the die 6, and (7) the angle formed by the filmy molten resin sheet 16 and the other filmy molten resin sheet 17 when they are overlapped.

In this way, the embossing of the filmy molten resin sheet 16 is carried out while it is in a molten state, and the other filmy molten resin sheet 17 is overwrapped, while it is still in a molten state, onto the filmy molten resin sheet 16 while it is likewise in a molten state. The portions on the filmy molten resin sheet 16 are sucked into the corresponding holes 47, 47, . . . of the endless molding belt 12 to form the bulged portions 70, 70, . . . is sealed therein when the other filmy molten resin 17 is bonded on the remaining flat surface of the one of the filmy molten resin 16 where a large number of bulged portions 70, 70, . . . have not been formed.

The filmy molten resin sheet 16 and the other filmy molten resin sheet 17 are overlapped on each other, and in this state they are pressed, bonded and cooled between the endless molding belt 12 and the holding and cooling roll 10 and then cured. The laminated body is then passed through the lower side of the holding and cooling roll 10, passing through between the holding roll 13 and the holding and cooling roll 10, and after passing through between the metal roll 55 and the rubber roll 57, wound on the take-up reel 65 mounted on the taking-up shaft 58. The rotating speed is controlled automatically in response to the increase in the diameter of the laminate wound on the take-up reel 65, and the laminate 71 is taken up at a constant winding speed.

Figure 9:
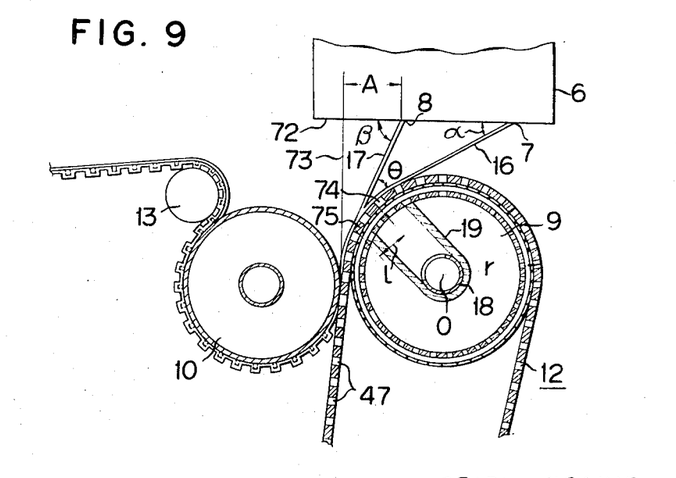
FIG. 9 is a view explaining the relation between one of the films to the other.
Figure 10:
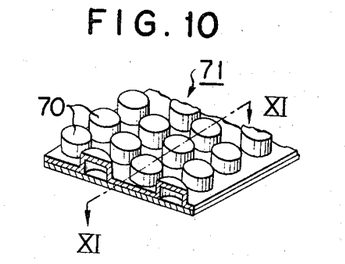
FIG. 10 is a perspective view of a laminate or laminated body produced according to the present invention.
Figure 11:
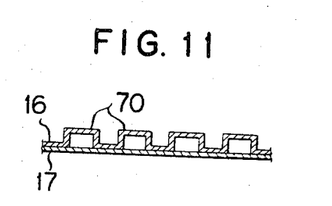
FIG. 11 is a longitudinal section of the laminate taken on line XI—XI in FIG. 10.

It is an important problem to determine the condition at which the filmy molten resin sheet 16 and the other filmy molten resin sheet 17 are bonded, and the explanation will be given thereon referring to FIG. 9.

Now, assuming the angle formed by the filmy molten resin sheet 16 and the lower surface 72 of the die 6 is $\alpha$, and the angle formed by the other filmy molten resin 17 and the lower surface 72 of the die 6 is $\beta$, the angle of intersection between the planes formed by extensions of the straight line portions of the filmy molten resin sheet 16 and the other filmy molten resin sheet 17 is $\theta$, and the horizontal distance between the common tangent 73 of the holding and cooling roll 10 and the endless molding belt 12 and the slit 8 which delivers the other filmy molten resin sheet 17 is A. It is preferable to select the molding temperature at $150° \sim 300°$ C, $\alpha = 10° \sim 80°$, $\beta = 20° \sim 90°$, and $A = 0° \sim 300$ mm. Putting the taking-up speed $= v$ mm/sec, the radius from the center 0 of the suction roll 9 to the circumference formed by the external peripheral surface of the endless molding belt $12 = r$, then the engaging angle $\theta$ formed between the filmy molten resin sheets 16 and 17 on the endless molding belt 12 from the directions tangential to said circumference is preferably selected to satisfy the relation $$\left(\frac{5.7v}{r} < \theta < \frac{115v}{r}\right)$$

In this way, two sheets of filmy molten resin 16, 17 are continuously extruded from the die 6 obliquely and downwardly at angles $\alpha$, $\beta$, respectively to the lower surface of the die 6, and determines a required distance $l$ from the contact point 74 of the filmy molten resin sheet 16 along the external curved surface of the suction roll 9, on which the molding belt 12 is contacted, to the contact point 75 of the filmy molten resin sheet 17. At the contact point 75, the filmy molten resin sheet 17 is engaged with the flat side of the filmy molten resin sheet 16, and the bonding is effected while the two sheets of filmy molten resin 16 and 17 are still in a molten state.

According to the present invention, it is possible not only to effect the molding of the filmy molten sheets and the forming of laminated body continuously and in a one pass operation, but also to effect the molding by using a relatively a small apparatus, and yet to assure sufficiently strong bonding and molding stability without requiring pressure adjustment of air to be sealed in the air cells.

With the present invention, using as the material a polyethylene having a melt index of 2, specific gravity of 0.924, and a die of the type "T" (width 600 mm) mounted on an extruder of the type "Long metalling" of Screen type with a caliber of 65 mm$\phi$, L/D 24, extruding continuously two sheets of filmy molten resin, and adjusting the molding temperature, angle $\alpha$, angle $\beta$, and distance A within said ranges to obtain the desired laminated body. The produced laminate has an air filling ratio of above 85%, a degree of haze of 25, and the fraction defective of bonding below 1%, and the air cell breakage ratio was zero, with the external appearance so excellent.

According to the present invention, the process is highly efficient because all the steps, from the molding of the film to the formation of the laminate, can be effected continuously and in one pass, which makes it possible to reduce the size of the apparatus. At the same time, the replacement of the endless molding belt is made easy. Thus a synthetic resin laminate having a large number of independent air cells is produced which has a sufficient molding stability, a high rate of air filling and an excellent transparency.

Figure 12:
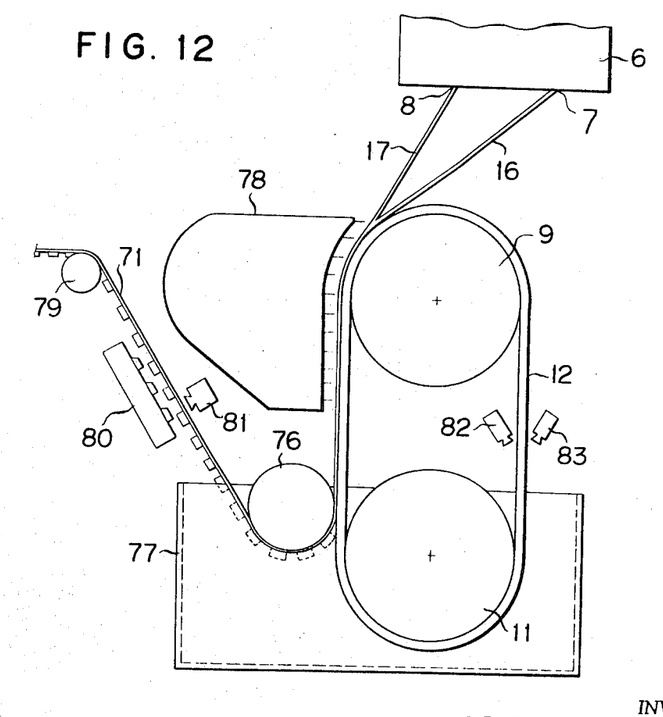
FIG. 12 is a view explaining another example of the present invention, showing the essential parts thereof.

It is also possible in the present invention, to use a pressing medium, instead of the holding and cooling roll, as shown in FIG. 12. As for the pressing mediums, in this case, substances which are gas state at ordinary temperature, such as compressed air, hydrogen, nitrogen, etc. or elastic, solid substances such as, rubber, etc. or liquid such as water or alcohol which remain as liquid at a temperature below the melting point of the resin.

In the example shown in FIG. 12, the mounting and cooling roll 11 mounted with the endless molding belt 12 and a separating roll 76 are immersed in a cooling water tank 77. The blowing device 78 of the pressing medium is disposed substantially at the same position as the holding and cooling roll 10 in the previous embodiment. At the path between the separating roll 76 and a guide roll 79, the water on the upper and lower surfaces of the laminate 71 is removed by water removing knives 80, 81, and also the front and rear surfaces of the endless molding belt 12 are removed of water by means of water removing knives 82 and 83. When the laminated body is pressed against the endless molding belt 12, the bonding strength is increased further, and a uniform, highly transparent laminated body is produced.

Figure 13:
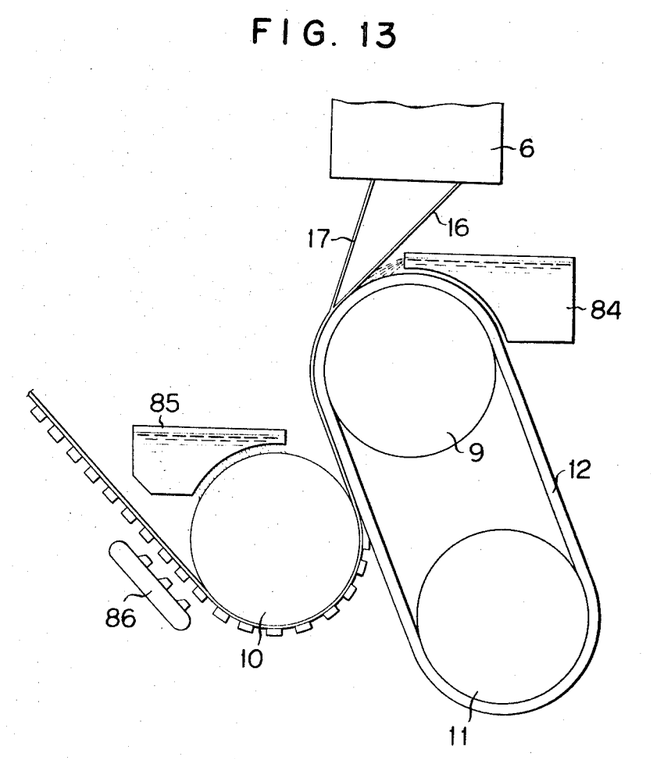
FIG. 13 is a view explaining still another example of the present invention.

In the embodiment shown in FIG. 13, according to the present invention, when the filmy molten resin sheet 16 is engaged with the curved path of the endless belt 12, a feeding device 84 for water is provided for supplying liquid such as cooling water between said endless molding belt 12 and the filmy molten resin sheet 16. In this method, a surface of the filmy molten resin sheet 16 which is not to be bonded is subjected to the embossing while being cooled rapidly by liquid such as cooling water. Since the bonding surface of the filmy molten resin sheet 16 is bonded to the other filmy molten resin sheet 17 while having a temperature sufficient for bonding, the thermal expansion of the air to be filled is kept small, thus it is possible to maintain a high rate of air filling with less shrinkage after the filling. Also the liquid medium such as cooling water serves to prevent the entrainment of unnecessary foreign matters such as air in the bonding area between the filmy molten resin sheet 16 and the other filmy molten resin sheet 17, thus a laminate having a high transparency and a high strength is produced. In the drawing, the numeral 85 designates the cooling device of the holding and cooling roll 10, while the numeral 86 shows a water removing knife.

Having described the examples of the present invention so far, it is to be understood to those skilled in the art, that it is intended to include all the changes and modifications of design without departing from the spirit and scope of the invention.

We claim:

1. Apparatus for producing thermoplastic synthetic resin laminates having a large number of independent air cells, characterized in that the apparatus comprises an extruder, a die mounted on said extruder and having at least two spaced parallel slits for supplying a filmy molten resin sheet from each slit, a rotatable suction roll disposed below said die and comprising a hollow cylindrical body, a vacuum box having an open side mounted within said cylindrical body, said vacuum box arranged in communication with a vacuum source, the inner peripheral surface of said cylindrical body being in sliding contact with the open side of said vacuum box, said cylindrical body having a plurality of holes formed therethrough for communication between the interior of said vacuum box and the exterior of said suction roll, a wire gauze wrapped around the outer periphery of said cylindrical body, a mounting and cooling roll disposed below said suction roll and the axis of said suction roll and said mounting and cooling roll being in parallel with the slits in said die, an endless molding belt formed with a large number of holes therethrough and said belt entrained around said suction roll and said mounting and cooling roll so that the holes therethrough communicate with the holes in said cylindrical body communicating with the vacuum box, said molding belt arranged to support the resin sheets with said support roll and mounting and cooling roll positioned in relationship to the slits in said die so that one of the sheets contacts said molding belt radially outwardly from the open side of said vacuum box at an angularly spaced position on said molding belt from the position where the other sheet contacts the one of the sheets in an overlapping arrangement, and a holding and cooling roll engaged with and pressed against the outer surface of said endless molding belt so that it contacts and presses the overlapped resin sheets against said belt.

2. Apparatus for producing thermoplastic synthetic resin laminates having a large number of independent air cells, characterized in that said apparatus comprises an extruder, a die mounted on said extruder and having at least two parallel slits; a suction roll consisting of a cylindrical body, a vacuum box positioned within said cylindrical body and having an open edge, a hollow shaft extending axially through said cylindrical body and disposed in communication with a vacuum source, said vacuum box being fixed on said hollow shaft, levers supporting both ends of said hollow shaft, and a wire gauze wrapped around the circumferential periphery of said cylindrical body; a mounting and cooling roll disposed below said suction roll; an endless molding belt formed with a large number of holes and passed around said suction roll and said mounting and cooling roll; a holding and cooling roll engaged with and pressed against said endless molding belt; the axis of said suction roll and of said holding and cooling roll being parallel to each of said slits, and said vacuum box being arranged so that the position of its opening with respect to said cylindrical body can be changed and regulated by means of swinging of said levers.

3. Apparatus for producing thermoplastic synthetic resin laminates having a large number of independent air cells, characterized in that said apparatus comprises an extruder, a die mounted on said extruder and having at least two parallel slits therein; a suction roll comprising a cylindrical body, a vacuum box disposed within said cylindrical body and having an open edge, the inner peripheral surface of said cylindrical body being in sliding contact with the open edge of said vacuum box, said cylindrical body having holes extending therethrough from its inner to its outer surface, and a wire gauze wrapped around the circumferential periphery of said cylindrical body; a mounting and cooling roll disposed below said suction roll, a hollow shaft positioned within and extending along the axis of said mounting and cooling roll, a feed water pipe inserted within said hollow shaft, and cooling water being supplied into the inner space of said mounting and cooling roll through said feed water pipe and said hollow shaft having an opening in its peripheral wall for removing the cooling water from within said mounting and cooling roll and for discharging it exteriorly of said mounting and cooling roll.

4. Apparatus for producing thermoplastic synthetic resin laminates having a large number of independent air cells, characterized in that said apparatus comprises an extruder, a die mounted on said extruder and having at least two parallel slits therein; a suction roll consisting of a cylindrical body, a vacuum box having an open edge positioned within said cylindrical body and said cylindrical body being disposed in sliding contact with the open edge of said vacuum box, said vacuum box being disposed in communication with a vacuum source, said cylindrical body having holes extending therethrough from its inner to its outer surface, and a wire gauze wrapped around the circumferential periphery of said cylindrical body; a mounting and colling roll disposed below said suction roll; an endless molding belt formed with a large number of holes extending therethrough and passed around said suction roll and said mounting and cooling roll; a holding and cooling roll engaged with and pressed against said endless molding belt, a hollow shaft extending through and along the axis of said holding and cooling roll, a feed water pipe extending through said hollow shaft, so that cooling water is supplied into the inner space of said holding and cooling roll through said feed water pipe and said hollow shaft having an opening therein for removing the cooling water from said holding and cooling roll for discharging the cooling water exteriorly of the holding and cooling roll.

5. Apparatus for producing thermoplastic synthetic resin laminates having a large number of independent air cells, characterized in that said apparatus comprises an extruder, a die mounted on said extruder and having at least two parallel slits therein; a suction roll comprising a cylindrical body, a hollow shaft extending axially through said cylindrical body, a vacuum box mounted on said hollow shaft within said cylindrical body and having an open edge therein, the inner peripheral surface of said cylindrical body being disposed in sliding contact with the open edge of said vacuum box, said vacuum box being in communication with a vacuum source, said cylindrical body having holes extending therethrough from its inner to its outer surface and a wire gauze wrapped around the circumferential periphery of said cylindrical body, a lever supporting each of the ends of said hollow shaft, a machine base arranged to support the said suction roll, a supporting shaft positioned on said machine base, the ends of said levers spaced from said suction roll being mounted on said supporting shaft, a connecting member attached to each said lever, a handle rotatably mounted on said machine base, a screw rod connected to said connecting member, a worm and worm wheel assembly connected to said handle and to said screw rod for movably positioning said levers for selectively positioning said suction roll.

6. Apparatus for producing thermoplastic synthetic resin laminates having a large number of independent air cells, characterized in that the apparatus comprises an extruder, a die mounted on said extruder and having at least two spaced parallel slits for supplying a filmy molten resin sheet from each slit, a rotatable suction roll disposed below said die and comprising a hollow cylindrical body, a vacuum box having an open side mounted within said cylindrical body, said vacuum box arranged in communication with a vacuum source, the inner peripheral surface of said cylindrical body being in sliding contact with the open side of said vacuum box, said cylindrical body having a plurality of holes formed therethrough for communication between the interior of said vacuum box and the exterior of said suction roll, a wire gauze wrapped around the outer periphery of said cylindrical body, a mounting and cooling roll disposed below said suction roll and the axis of said suction roll and said mounting and cooling roll being in parallel with the slits in said die, an endless molding belt formed with a large number of holes therethrough and said belt entrained around said suction roll and said mounting and cooling roll so that the holes therethrough communicate with the holes in said cylindrical body communicating with the vacuum box, said molding belt arranged to support the resin sheets with said support roll and mounting and cooling roll positioned in relationship to the slits in said die so that one of the sheets contacts said molding belt radially outwardly from the open side of said vacuum box at an angularly spaced position on said molding belt from the position where the other sheet contacts the one of the sheets in an overlapping arrangement, a holding and cooling roll engaged with and pressed against the outer surface of said endless molding belt so that it contacts and presses the overlapped resin sheets against said belt; and a taking-up device arranged to make the taking-up speed constant by changing automatically the rotating speed of the taking-up shaft in response to the diameter of the laminate wound on the take-up reel.

* * * * *